(No Model.)
U. GÖTZENBRÜGGER.
Vehicle Wheel.
No. 241,971.      Patented May 24, 1881.
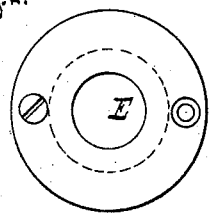
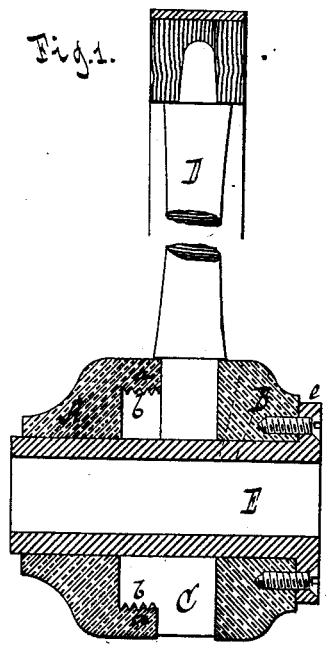
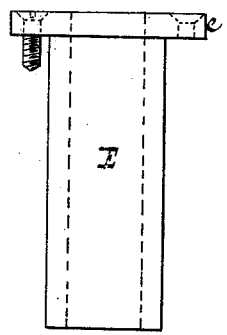
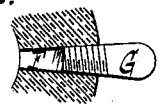
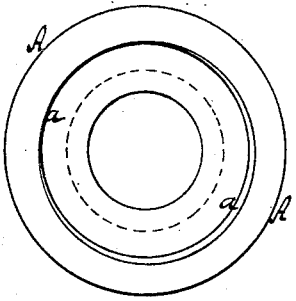
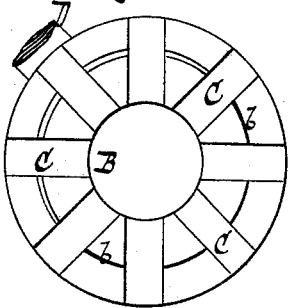
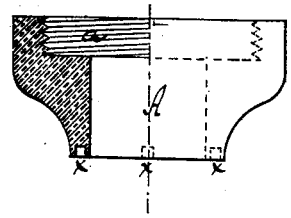
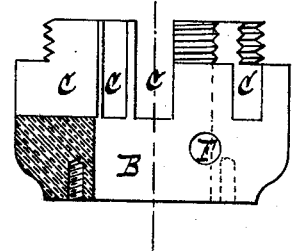
Witnesses
Otto Hufeland
William Miller
Inventor
Urban Götzenbrügger
by Van Santvoord & Hauff
his att'ys.

UNITED STATES PATENT OFFICE.

URBAN GÖTZENBRÜGGER, OF VIENNA, AUSTRIA.

VEHICLE-WHEEL.

SPECIFICATION forming part of Letters Patent No. 241,971, dated May 24, 1881.

Application filed April 5, 1881. (No model.)

*To all whom it may concern:*

Be it known that I, URBAN GÖTZENBRÜGGER, a citizen of Austria, residing at Vienna, Austria, have invented new and useful Improvements in Vehicle-Wheels, of which the following is a specification.

This invention relates to a wheel the hub of which is made in two parts, one part being provided with an inner screw-thread and the other part with a corresponding outer screw-thread, so that one of these parts may be partly screwed into the other, thus firmly clamping the spokes, which are inserted in recesses or slots in one of said parts.

This invention is illustrated in the accompanying drawings, in which Figure 1 is a transverse section of the wheel when put together, leaving away the lower half of the spokes and rim. Fig. 2 is a plan, and Fig. 3 a side view, of the bush. Fig. 4 is a plan of the inner side of part A of the hub. Fig. 5 is a side view of the same, one-half in section. Fig. 6 is a plan of the inner side of the part B of the hub. Fig. 7 is a side view of the same, one-half in section. Fig. 8 is a view of a spoke, and Fig. 9 the lubricating-orifice.

Similar letters indicate corresponding parts.

The hub of this wheel is made either of wood or metal, preferably metal, and consists of two principal parts, A and B. A is the part on the outside of the wheel and B that of the inside next the vehicle. The part A is recessed and provided with a female screw-thread, $a$, Figs. 1 and 5, for the reception of reduced and also a sectionally threaded rim, $b$, on the part B. The part B, as shown in Figs. 6 and 7, is provided with radial slots or recesses $c$, as many in number as the wheel is to contain spokes. These recesses $c$ serve as mortises for the reception of the spokes or spoke-tenons, and are of such depth that when the spokes are inserted the two parts A and B may be screwed together face to shoulder, as shown in Fig. 1.

The spokes D, Fig. 8, have tenons on each end. Those intended to fit in the hub are preferably square, and those intended to go in the fellies round and somewhat conical. This, however, is not essential, as the spokes may be used differently tenoned or of one thickness throughout, without any shoulder, or only tenoned at one end. In the hub is fitted a bush, E, provided with flange $e$, the latter serving to secure said bush, forming the bearing for the axle, to the hub by screws, as shown in Fig. 1, or in other suitable manner. This bush E is somewhat longer than the hub, so that it projects a little on the other side, so that, if desired, a cap or similar device may be fixed upon it.

Through the hub and bush is drilled a hole, F, for introducing lubricants to the axle. This hole is kept closed by a threaded stopper or plug, G.

By the arrangement of the wheel and its parts as described and shown, it is obvious that the hub of the same is not subject to any wear whatever, as the flange of bush E receives the friction against the shoulder of the axle, and the projecting part of bush E protects the outside part of the hub. Consequently this hub may be used continuously, and only from time to time, according to the wear, a spoke, bush, or felly will have to be replaced. This can be readily done, even when on the road, without taking off the wheel, by simply unscrewing part A by means of a wrench fitting into the holes $x$, drilled or cast into the part A, replacing the desired part by a new one, and again screwing the part A tightly up against the part B.

What I claim as new, and desire to secure by Letters Patent, is—

In a vehicle-wheel, the part B, formed integral with the sectional externally-threaded rim $b$, and the series of radial recesses $c$, in combination with the part A, formed integral with the internal screw-thread, $a$, and the bushing E, extending through the two parts and supporting the spokes, all substantially as shown and described.

In testimony whereof I have hereunto set my hand in the presence of two subscribing witnesses.

URBAN GÖTZENBRÜGGER.

Witnesses:
ROBT. B. JENTZSCK,
VERNER S. TINGLEY.